(12) United States Patent
Berler et al.

(10) Patent No.: US 10,984,093 B2
(45) Date of Patent: Apr. 20, 2021

(54) MEMORY AND CONTROLLER MUTUAL SECURE CHANNEL ASSOCIATION

(71) Applicant: Western Digital Technologies, Inc., San Jose, CA (US)

(72) Inventors: Danny Berler, Tel-Mond (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 232 days.

(21) Appl. No.: 15/967,528

(22) Filed: Apr. 30, 2018

(65) Prior Publication Data
US 2019/0332763 A1    Oct. 31, 2019

(51) Int. Cl.
*G06F 21/44* (2013.01)
*H04L 9/32* (2006.01)
*H04L 9/06* (2006.01)
*G06F 7/58* (2006.01)

(52) U.S. Cl.
CPC ......... *G06F 21/445* (2013.01); *H04L 9/0643* (2013.01); *H04L 9/3271* (2013.01); *G06F 7/582* (2013.01); *H04L 2209/08* (2013.01)

(58) Field of Classification Search
CPC ..... G06F 21/445; G06F 7/582; H04L 9/0643; H04L 9/3271; H04L 2209/08
See application file for complete search history.

(56) References Cited

U.S. PATENT DOCUMENTS

| | | | | |
|---|---|---|---|---|
| 6,351,813 B1* | 2/2002 | Mooney | ............ | G06F 12/1408 380/259 |
| 7,853,984 B2* | 12/2010 | Antell | ............ | H04L 63/08 713/182 |
| 9,129,138 B1* | 9/2015 | Hesselink | ............ | G06F 21/78 |
| 2003/0154355 A1* | 8/2003 | Fernandez | ......... | G06F 12/1466 711/163 |
| 2005/0114680 A1* | 5/2005 | Chinnaswamy | ......... | H04W 12/04031 713/185 |
| 2007/0005967 A1* | 1/2007 | Mister | ............ | H04L 9/3228 713/168 |
| 2008/0005121 A1* | 1/2008 | Lam | ............ | G06F 16/10 |
| 2009/0013190 A1* | 1/2009 | Benhammou | ......... | G06F 12/1458 713/185 |
| 2009/0193264 A1* | 7/2009 | Fedronic | ............ | G06F 21/31 713/184 |
| 2009/0222910 A1* | 9/2009 | Le Bihan | ............ | G06F 21/445 726/19 |

(Continued)

*Primary Examiner* — Sher A Khan
(74) *Attorney, Agent, or Firm* — Patterson & Sheridan, LLP; Steven H. Versteeg

(57) ABSTRACT

The disclosure describes methods and systems for a storage device that includes one or more memory devices, where the memory devices store a second challenge question and a first response key. The system also includes an interface and a storage controller coupled to the interface and coupled to the memory devices. The storage controller generates an enable signal for enabling access to the memory devices. The system also includes a security module coupled to the storage controller and configured to send and receive challenge requests and challenge responses, where the security module includes a first challenge question and a second response key corresponding to each of the memory devices.

25 Claims, 4 Drawing Sheets

(56) References Cited

U.S. PATENT DOCUMENTS

| | | | |
|---|---|---|---|
| 2010/0073147 A1* | 3/2010 | Guajardo Merchan | ....................... G06K 19/07309 340/10.51 |
| 2011/0145900 A1* | 6/2011 | Chern | ................... H04L 9/3271 726/7 |
| 2012/0108206 A1* | 5/2012 | Haggerty | ............ H04L 63/0876 455/411 |
| 2016/0301534 A1* | 10/2016 | Chen | ..................... H04L 9/3278 |
| 2018/0270067 A1* | 9/2018 | Woo | ....................... H04L 9/3228 |
| 2018/0293190 A1* | 10/2018 | Jang | ..................... G06F 13/1689 |
| 2018/0337916 A1* | 11/2018 | Ellis | ...................... H04L 9/0866 |

\* cited by examiner

MEMORY AND CONTROLLER MUTUAL SECURE CHANNEL ASSOCIATION

BACKGROUND OF THE DISCLOSURE

Field of the Disclosure

Embodiments of the present disclosure generally relate to storage devices, and more specifically to security measures used with storage devices.

Description of the Related Art

In the computer security field, challenge response authentication is a family of protocols in which one party presents a question ("challenge") and another party must provide a valid answer ("response") to be authenticated. One example of a challenge-response protocol is password authentication, where the challenge is asking for the password and the valid response is the correct password. An adversary who can eavesdrop on a password authentication procedure can then authenticate itself in the same way. In some embodiments, authentication protocols employ a cryptographic nonce (an arbitrary number that can be used only once and is typically a random or pseudorandom number to ensure that older communications cannot be reused) to ensure that every challenge-response sequence is unique. Single-use nonces protect against man-in-the-middle attacks and subsequent replay attacks.

For data storage devices, unauthorized users can remove and replace individual memory drives and storage controllers and bypass the security measures provided by the storage controller. Thus what is needed is a method of preventing unauthorized users from replacing a memory device or a storage controller with a copy to gain access to a host device such as a cellphone, a solid state drive (SSD), and the like.

SUMMARY OF THE DISCLOSURE

In one embodiment, the disclosure describes methods and systems for a storage device that includes one or more memory devices, where the memory devices store a second challenge question and a first response key. The system also includes an interface and a storage controller coupled to the interface and coupled to the memory devices. The storage controller generates an enable signal for enabling access to the memory devices. The system also includes a security module coupled to the storage controller and configured to send and receive challenge requests and responses, where the security module includes a first challenge question and a second response key corresponding to each of the memory devices.

In another embodiment, the disclosure also includes a method of operating a storage device, comprising generating, by a security module coupled to a storage controller, a first challenge request and sending the first challenge request to a memory device via the storage controller; sending, by the memory device, a first response key in response to the first challenge request to the security device via the storage controller; and generating, by the memory device, a second challenge request and sending the second challenge request to the security module via the storage controller. The disclosure also includes sending, by the security module, a second response key in response to the second challenge request to the memory device via the storage controller; generating, by the memory device, an acknowledgement signal based on comparing the second response key and a second predetermined value; and generating, by the storage controller, an enable signal and sending the enable signal to the memory device based on comparing the first response key to a first predetermined value and receiving the acknowledgement signal from the memory device.

In another embodiment, the disclosure includes a method of operating a storage device, comprising generating, by a security module coupled to a storage controller, a first challenge request and sending the first challenge request to a memory device via the storage controller; and sending, by the memory device, a first response key in response to the first challenge request to the security device via the storage controller. The disclosure also includes comparing, by the storage controller, the first response key to a predetermined value stored by the security module; and disabling, by the storage controller, an enable signal to the memory device based on an unsuccessful comparison.

In another embodiment, the disclosure includes a storage device, comprising one or more memory devices, where the one or more memory devices includes a second challenge question and a first response key, an interface, and a storage controller coupled to the interface and coupled to the one or more memory devices, where the storage controller generates an enable signal sent to the one or more memory devices for enabling access to the one or more memory devices. The disclosure also includes a security module coupled to the storage controller and configured to send and receive challenge requests and challenge responses, where the security module includes a first challenge question and a second response key, and means for enabling and disabling access to the one or more memory devices by employing multiple challenges and responses for mutual authentication of the one or more memory devices.

In another embodiment, the disclosure includes a storage system, having a host device, one or more memory devices, where each of the one or more memory devices is configured to store a second challenge question and a first response key, and an interface configured to couple to the host device. The disclosure also includes a storage controller coupled to the interface and coupled to the one or more memory devices, where the storage controller generates an enable signal for enabling access to the one or more memory devices, and a security module coupled to the storage controller and configured to send and receive challenge requests and challenge responses, where the security module includes a first challenge question and a second response key corresponding to each of the one or more memory devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The disclosure describes methods and systems for a storage device that includes one or more memory devices, where the memory devices store a second challenge question and a first response key. The system also includes an interface and a storage controller coupled to the interface and coupled to the memory devices. The storage controller generates an enable signal for enabling access to the memory devices. The system also includes a security module coupled to the storage controller and configured to send and receive challenge requests and challenge responses, where the security module includes a first challenge question and a second response key corresponding to each of the memory devices.

Figure 1:
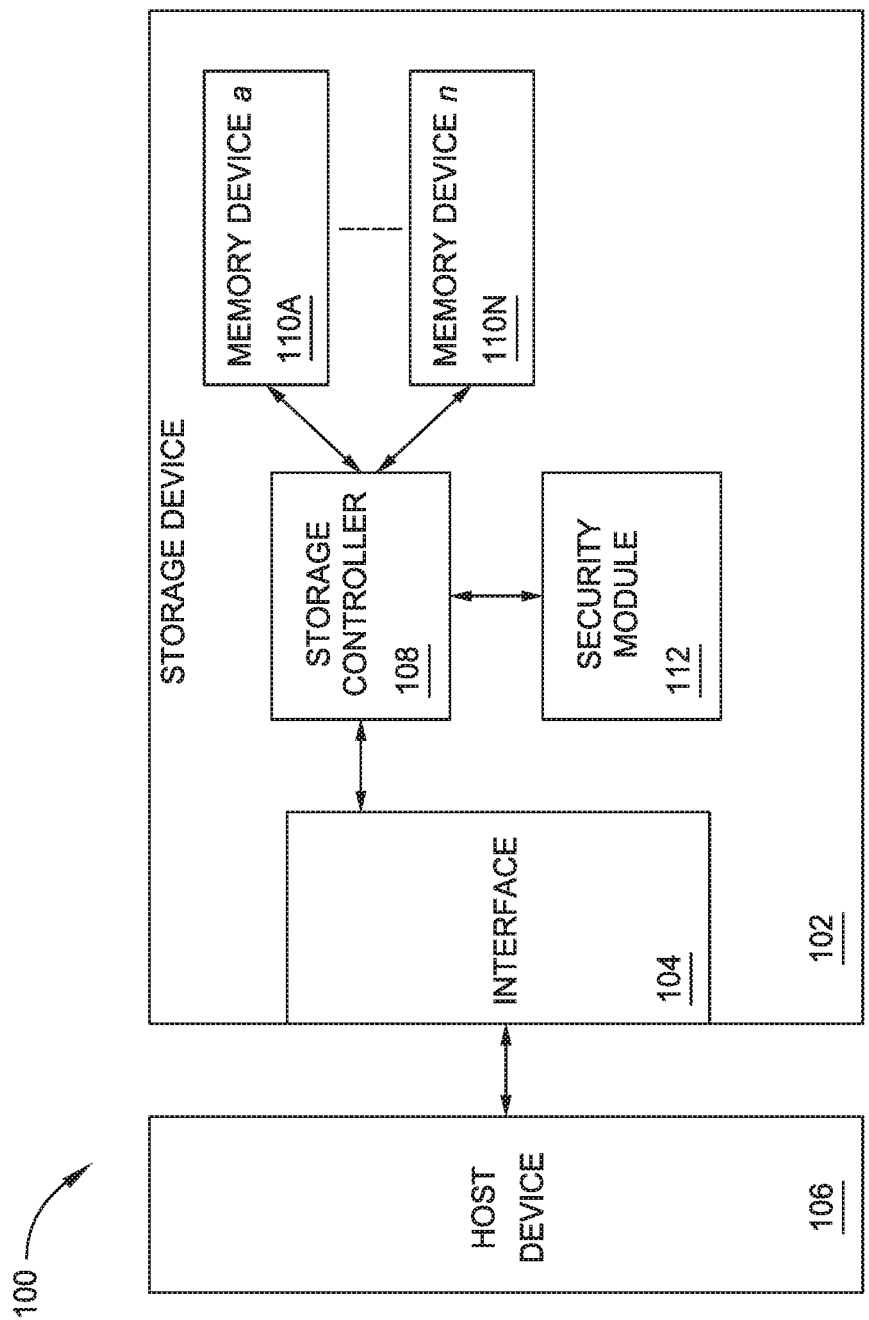
FIG. 1 is a schematic block diagram illustrating a storage system in which a storage device is coupled with a host device, according to one embodiment.

FIG. 1 is a schematic block diagram illustrating a storage system 100 in which a storage device 102 functions as memory storage and control, or a storage array, and is coupled with a host device 106, according to one embodiment. In some embodiments, the storage system 100 can include a plurality of storage devices 102 configured as a redundant array of independent disks (RAID) that collectively function as a mass storage device for the host device 106. In one embodiment, host device 106 can utilize non-volatile memory devices included in the storage device 102 to store and retrieve data. As illustrated in FIG. 1, host device 106 communicates with the storage device 102 via an interface 104. The host device 106 can include any of a wide range of devices, including computer servers, network attached storage (NAS) units, desktop computers, notebooks (e.g., laptops) computers, tablet computers, set-top boxes, telephone handsets such as "smart" phones, "smart" pads, televisions, cameras, display devices, digital media players, video gaming consoles, video streaming devices, and the like.

As illustrated in FIG. 1, the storage device 102 includes the interface 104 coupled to the host device 106, a storage controller 108, a security module 112, and one or more non-volatile memory devices (memory devices) 110A-110N (numbered a-n). In some examples, the storage device 102 may include additional components or modules not shown in FIG. 1 for the sake of clarity. As an example, the storage device 102 may include a printed circuit board (PCB) to which components and modules of the storage device 102 are mechanically attached and which includes electrically-conductive traces that electrically interconnect components and modules of the storage device 102, and the like. In some examples, the physical dimensions and connector configurations of the storage device 102 conforms to one or more standard form factors. Some example standard form factors include, but are not limited to, a 3.5" data storage device (e.g., a hard disk drive (HDD) or SSD), 2.5" data storage device, a 1.8" data storage device, a peripheral component interconnect (PCI), a PCI-extended (PCI-X), a PCI Express (PCIe) (e.g., PCIe ×1, ×4, ×8, ×16, PCIe Mini Card, MiniPCI, and the like). In some embodiments, the storage device 102 may be directly coupled (e.g., directly soldered) to a motherboard of the host device 106.

The interface 104 may include a data bus for exchanging data with the host device 106 and a control bus for exchanging commands with the host device 106. The interface 104 may operate in accordance with any suitable protocol. As an example, the interface 104 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially-attached SCSI (SAS), PCI, PCIe, non-volatile memory express (NVMe, and the like). The electrical connections of the interface 104 (e.g., the data bus, the control bus, or both) are electrically connected to the storage controller 108, providing electrical connections between the host device 106 and the storage controller 108. In some embodiments, the electrical connections of the interface 104 may also permit storage device 102 to receive power from the host device 106.

The storage device 102 includes memory devices 110A-110N which may include a plurality of individual devices numbers a-n. Memory devices 110A-110N may be configured to store and/or retrieve data. As an example, one memory device 110A may receive data and a message from the storage controller 108 that instructs the memory device 110A to store the data. Similarly, the memory device 110A may receive a message from the storage controller 108 that instructs the memory device 110A to retrieve data. In some examples, each of the plurality of memory devices 110A-110N may be referred to as a die. In some embodiments, a single physical integrated circuit (IC or chip) may include a plurality of dies (i.e., a plurality of memory devices). In some embodiments, each memory device 110A-110N may be configured to store relatively large amounts of data (e.g., 128 MB, 256 MB, 1 GB, 2 GB, 4 GB, 8 GB, 16 GB, 32 GB, 64 GB, 128 GB, 256 GB, 512 GB, 1 TB, and the like). The examples listed herein are not limiting and other sizes are possible. Also, in some embodiments, each memory device 110A-110N may include any type of non-volatile memory, such as flash memory devices, phase-change memory (PCM) devices, resistive random-access memory (ReRAM) devices, magnetoresistive random-access memory (MRAM)

devices, ferroelectric random-access memory (F-RAM), holographic memory devices, and any other type of non-volatile memory devices.

Flash memory devices may include NAND or NOR-based flash memory devices, and may store data based on a charge contained in a floating gate of a transistor for each memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. The storage controller 108 may write data to, and read data from, NAND flash memory devices at the page level and erase data from NAND flash memory devices at the block level.

Continuing with FIG. 1, the storage device 102 includes the storage controller 108, which manages one or more operations of the storage device 102. As an example, the storage controller 108 may manage the reading and/or writing of data from/to the memory devices 110A-110N. In some embodiments, if the storage device 102 receives a write command from the host device 106, the storage controller 108 may initiate a data storage command to store data to the memory devices 110A-110N and monitor the progress of the data storage command. In at least some embodiments, the storage controller 108 may determine at least one operational characteristic of the storage system 100 and cause the at least one operational characteristic of the storage system 100 to be stored to memory (e.g., to memory devices 110A-110N). As an example, operational characteristics may include controller register information, firmware data structures, firmware event history, host-configured mode settings (e.g., formatted capacity, power modes, encryption modes, and the like), device state (e.g., amount of drive space used, temperature of device, state of SMART parameters, etc.), host command sequence and history, and the like. Examples of firmware data structures may include performance and workload statistics, error statistics, state information of non-volatile memory (such as amount of valid customer data and amount of memory ready to store new customer data). In some embodiments, the storage controller 108 can store the operational characteristics in a system area of one or more memory devices 110A-110N.

In one embodiment, the security module 112 is a hardware circuit that is located in the storage device 102 separate from the storage controller 108. In other embodiments, the security module 112 is a hardware circuit co-located with, and fabricated at the same time as the storage controller 108. In yet other embodiments, the security module 112 is software or firmware located in the storage controller 108 or the storage device 102. Other embodiments are possible and are not limited by the disclosure herein. The security module 112 includes challenges and keys for mutual challenge-response procedures between the storage controller 108 and the one or more memory devices 110A-110N. More information about the storage controller 108 and the security module 112 are described in further detail in FIG. 2.

Figure 2:
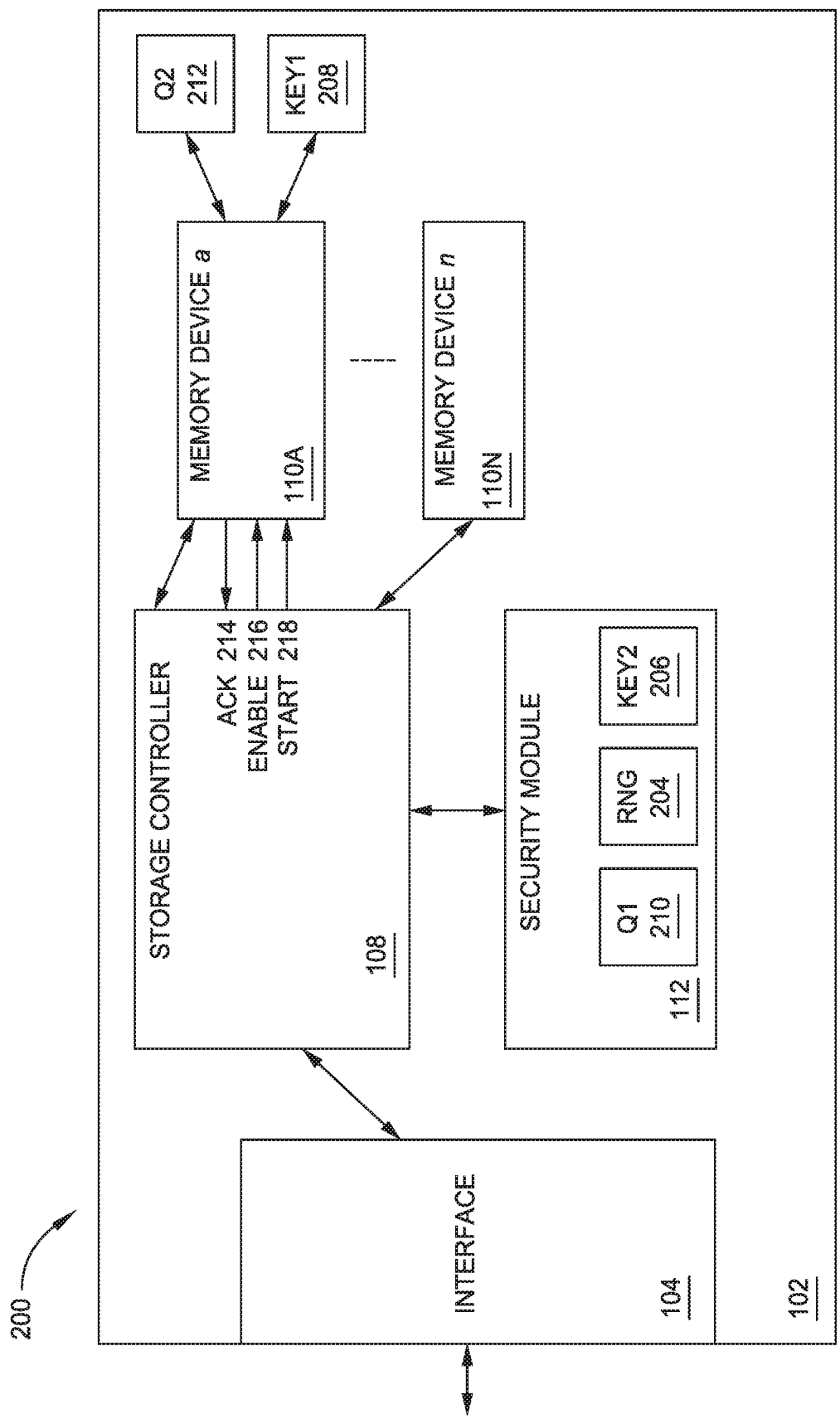
FIG. 2 illustrates a storage device employing a mutual security protocol for a storage device using a storage controller and memory devices, according to another embodiment.

FIG. 2 illustrates a block diagram of a storage device 200 employing a mutual security protocol for the storage device 102 of FIG. 1 using the storage controller 108 and one or more memory devices 110A-110N, according to one embodiment. The storage controller 108 (of FIG. 1) generates an enable signal 216 and sends the enable signal 216 to the one or more memory devices 110A-110N when the mutual challenges and responses are "true". The storage controller 108 also can withdraw the enable signal 216 prior to completion of the challenge-response protocol, or when a challenge-response comes back "false".

The security module 112 further includes one or more memory locations which can store a first challenge question 210 and a second response key 206. The security module 112 can also include a random number generator (RNG) 204 that creates a cryptographic nonce alphanumeric value for use in generating the second response key 206. In some embodiments, the RNG 204 is a pseudorandom number generator, while in other embodiments the RNG 204 is code executing a hash function. Also in some embodiments, the RNG 204 is located within the storage controller 108 or elsewhere within the storage device 102. In yet other embodiments, the response keys are generated at the time of manufacture of the system and are installed or uploaded during fabrication. Other possibilities are possible and are not limited by this disclosure.

Continuing with the storage device of FIG. 2, the one or more memory devices 110A-110N include an acknowledgement signal 214 that is sent to the storage controller 108 when the one or more memory devices 110A-110N sends out a second challenge question 212 to the security module 112 via the storage controller 108, receives the second response key 206 from the security module 112 via the storage controller 108, and determines that the response is valid. The acknowledgement signal 214 alerts the storage controller 108 that the one or more memory devices 110A-110N accepts the second response key 206 as valid and to proceed with normal operations. When the one or more memory devices 110A-110N determines that the second response key 206 is not valid, the acknowledgement signal 214 is withdrawn and the storage controller 108 can then proceed with either limiting access to the memory devices 110A-110N or stopped or stopping operations altogether.

In some embodiments, the storage device 102 also includes a start signal 218 that is generated by the storage controller 108 and sent to the one or more memory devices 110A-110N. In this embodiment, the storage controller 108 can initiate further challenges and response processes on demand and in addition to the process running at power-up. In operation, once the memory devices 110A-110N receive the start signal, the memory devices 110A-110N sends the second challenge question 212 to the security module 112 via the storage controller 108 in an effort to add enhanced security measures to the storage system 100. Furthermore, in some embodiments, the storage controller can send the start signal 218 to the memory devices 110A-110N as the first step in a challenge-response process as described herein prior to sending the first challenge question 210 to the memory devices 110A-110N In some embodiments, only one memory device 110A includes the second challenge question 212, a first response key 208, and the acknowledgement signal 214. In other embodiments, some or all of the memory devices 110A-110N contain individualized or common challenges, responses, and acknowledgement signals. Various iterations or combinations of challenges, responses, and acknowledgement signals are possible, and can be utilized to hinder unauthorized users' efforts in accessing systems, devices, and signals as appropriate.

Figure 3:
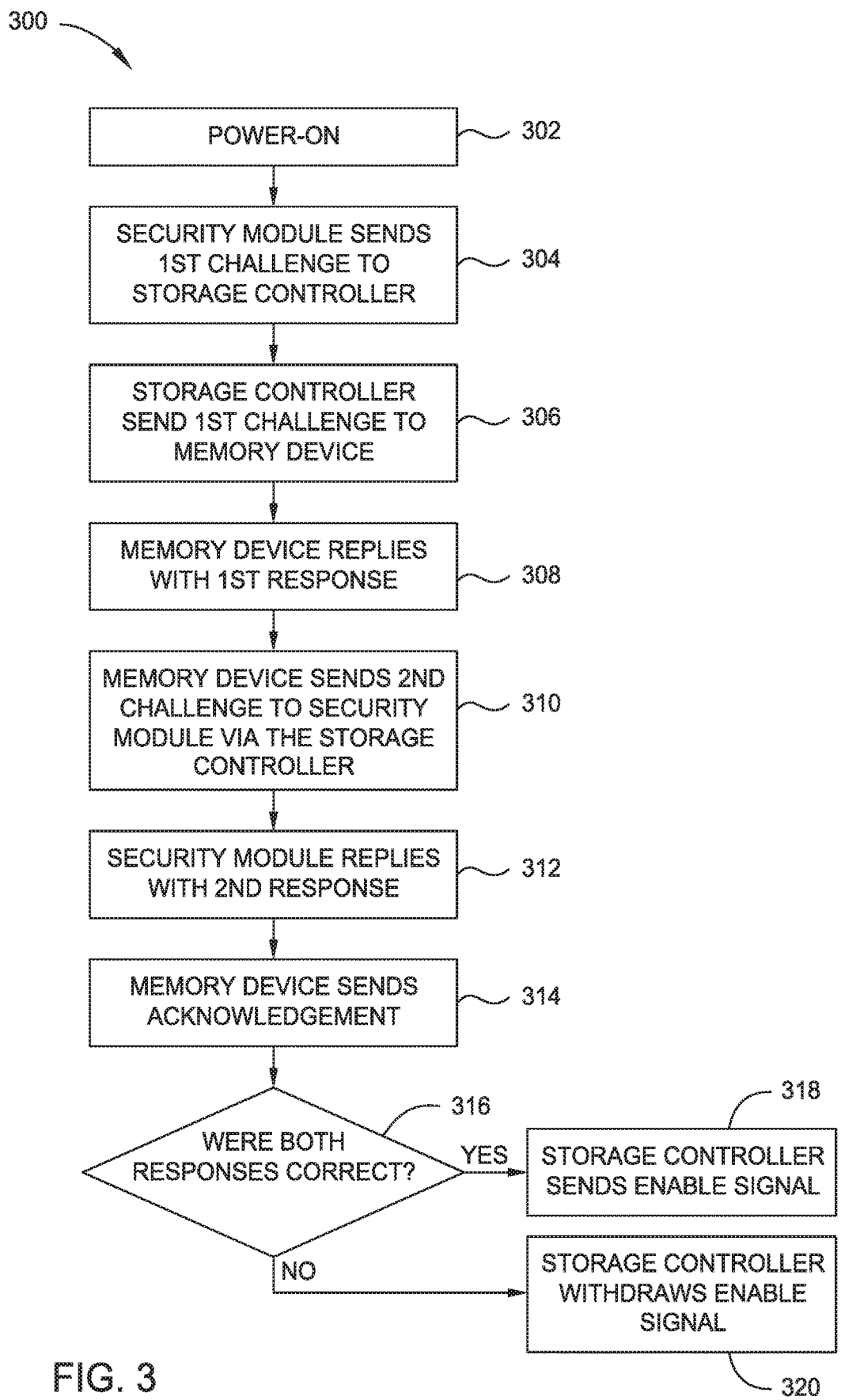
FIG. 3 illustrates a flowchart representing a method for mutual security between a storage device and memory devices, according to one embodiment.

FIG. 3 illustrates a flowchart representing a method 300 for mutual security between the storage device 102 (of FIG. 1) and one or more memory devices 110A-110N (of FIG. 1), according to one embodiment. The method 300 may be used to operate the storage system 100 of FIG. 1. Method 300 includes the host device 106 of FIG. 1 powering up and sending a power-up signal (not shown) to the storage controller 108 via the interface 104 at block 302. Next, at block 304, upon receiving the power-up signal from the host device 106, the storage controller 108 queries the security module 112 for the first challenge question 210 and in reply, the security module 112 sends the first challenge question 210 to the storage controller 108. Next, at block 306, the storage controller 108 sends the first challenge question 210 to one or more of the memory devices 110A-110N using either a command bus or a data bus communications link.

FIG. 3 continues with the one or more memory devices 110A-110N replying to the first challenge question 210 by sending the first response key 208 back to the storage controller 108 at block 308. In one embodiment, the first response key 208 is a cryptographic nonce (generated by the RNG 204 of FIG. 2) and is a one-time-use random or pseudorandom and unique alphanumeric value. In some embodiments, it is impractical for the storage system 100 to generate a true random nonce so alternative methods are employed, including but not limited to using a cryptographically-secure pseudorandom number generator or employing a cryptographically-secure hash function in software to generate a response key. Continuing with FIG. 3, the method 300 continues with the memory device 110A-110N sending the second challenge question 212 to the security module 112 via the storage controller 108 at block 310. Next, at block 312, the security module 112 replies to the second challenge question 212 from the memory device 110A-110N by sending the second response key 206 via the storage controller 108 to the one or more memory devices 110A-110N. Next, at block 314, the memory device 110A-110N compares the second response key 206 with a predetermined list of approved responses and sends the acknowledgement signal 214 to the storage controller 108 when the second response key 206 has been reviewed and accepted. Next, at decision block 316, the storage controller 108 decides whether the first response key 208 is accepted and whether the acknowledgement signal 214 has been received from the memory devices 110A-110N. When both conditions (the acknowledgement signal 214 and the acceptance of the first response key 208) are true, the storage controller 108 generates the enable signal 216 at block 318 and sends the enable signal 216 to the one or more memory devices 110A-110N. The enable signal 216 is received by the memory devices 110A-110N and allows for the memory devices 110A-110N to operate normally. When one or both of the conditions (the acknowledgement signal 214 and the acceptance of the first response key 208) are false, the storage controller 108 withdraws the enable signal 216 at block 320, rendering the memory devices 110A-110N inactive and preventing their use in the storage system 100 or use by the host device 106.

In use, the method 300 of FIG. 3 discloses a mutual use of challenges and responses between the storage controller 108 and one or more memory devices 110A-110N. If, in one example, an unauthorized user replaces the storage controller, the storage system 100 would detect such an action and fail to operate. Also, if the unauthorized user manages to replace a memory device 110A, the method 300 would detect such an action and hinder or stop access to the host device 106 as appropriate.

Figure 4:
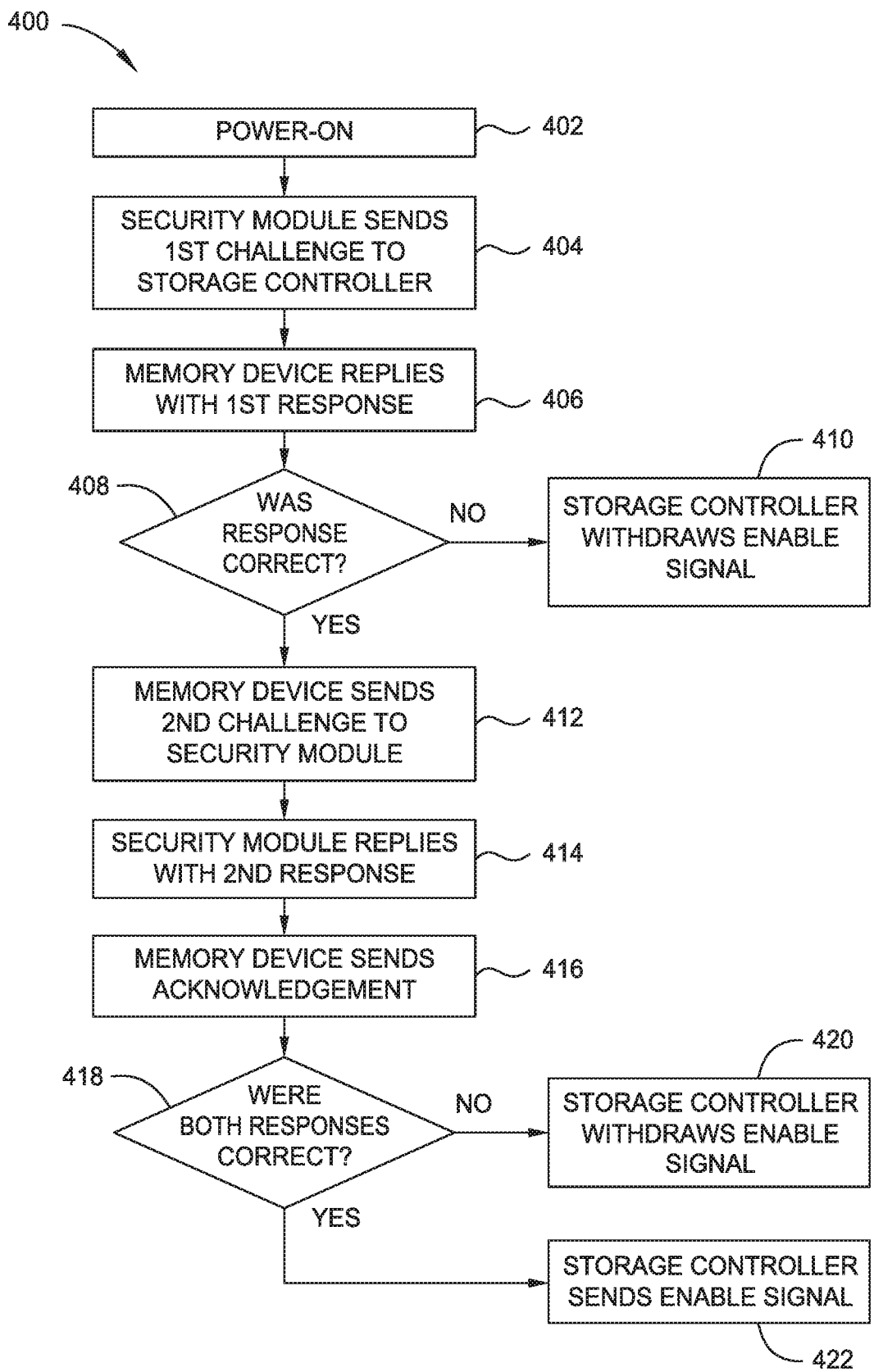
FIG. 4 illustrates a flowchart representing a method for mutual security when a challenge fails between a storage controller and memory devices, according to another embodiment.

FIG. 4 illustrates a flowchart representing a method 400 of mutual security when a challenge is unsuccessful, or fails, between the storage controller 108 and one or more memory devices 110A-110N, according to another embodiment. Method 400 is similar to the method 300 disclosed in FIG. 3, but with different consequences due to the storage controller 108 determining that an unsuccessful, or failed, challenge and response process has occurred. Method 400 begins with block 402, where the power-on signal is sent from the host device 106 of FIG. 1 to the storage controller 108 via the interface 104. Next, at block 404, upon receiving the power-up signal from the host device 106, the storage controller 108 queries the security module 112 for the first challenge question 210 and in reply, the security module 112 sends the first challenge question 210 to the memory devices 110A-110N via the storage controller 108. Next, at block 406, the one or more memory devices 110A-110N replies to the first challenge question 210 by sending the first response key 208 back to the storage controller 108. Next, at decision block 408, the storage controller 108 determines whether the received first response key 208 is accepted by the security module 112. If the answer is "NO", the method 400 continues to block 410 where the storage controller 108 withdraws the enable signal 216 to the memory devices 110A-110N, rendering them inactive, and ending the method 400. If the answer at decision block 408 is "YES", the storage controller 108 continues and proceeds to block 412. At block 412, the memory device 110A-110N sends the second challenge question 212 to the security module 112 via the storage controller 108. Next, at block 414, the security module 112 replies to the second challenge question 212 from the memory device 110A-110N by sending the second response key 206 via the storage controller 108 to the memory devices 110A-110N. Next, at block 416, the memory device 110A-110N compares the second response key 206 with a predetermined list of approved responses and sends the acknowledgement signal 214 to the storage controller 108 when the second response key 206 has been reviewed and accepted. At decision block 418, the storage controller decides whether the acknowledgement signal 214 has been received from the memory devices 110A-110N. If the answer is "YES", at block 422 the method 400 sends the enable signal 216 and sends the enable signal 216 to the one or more memory devices 110A-110N. The enable signal 216 is received by the memory devices 110A-110N and allows for the memory devices 110A-110N to operate normally. When the acknowledgement signal 214 is absent, the storage controller 108 withdraws the enable signal 216 at block 420, thus rendering the memory devices 110A-110N inactive and preventing their use in the storage system 100 or use by the host device 106.

Disclosed herein are methods and systems for a memory and controller mutual secure channel association security process where both the storage controller and the one or more memory devices exchange both challenges and responses to thwart unauthorized users from replacing components of the system in an effort to gain access to the data contained within. The methods and systems include generating unique and pseudorandom keys and mutual exchange of challenges and responses at power start-up and during the normal operation of the system.

This disclosure includes a storage device that includes one or more memory devices, where each of the one or more memory devices is configured to store a second challenge question and a first response key, an interface, a storage controller coupled to the interface and coupled to the one or more memory devices, where the storage controller generates an enable signal for enabling access to the one or more memory devices, and a security module coupled to the storage controller and configured to send and receive challenge requests and challenge responses, where the security module includes a first challenge question and a second response key corresponding to each of the one or more memory devices. The storage device also includes where the security module is a hardware device electrically coupled to the storage controller. The storage device also includes where the security module comprises firmware. The storage device also includes where the challenge response is a cryptographic nonce comprising a unique and random alphanumeric value. The storage device also includes where the challenge response is generated by a cryptographically-secure pseudorandom number generator. The storage device also includes where the challenge response is generated by a cryptographically-secure hash function. The storage device also includes where the storage controller is configured to manage access to the one or more memory devices by sending the enable signal to the one or more memory devices.

This disclosure also includes a method of operating a storage device, comprising generating, by a security module coupled to a storage controller, a first challenge request and sending the first challenge request a memory device via the storage controller, sending, by the memory device, a first response key in response to the first challenge request to the security device via the storage controller, generating, by the memory device, a second challenge request and sending the second challenge request to the security module via the storage controller, sending, by the security module, a second response key in response to the second challenge request to the memory device via the storage controller, generating, by the memory device, an acknowledgement signal based on comparing the second response key and a second predetermined value, and generating, by the storage controller, an enable signal and sending the enable signal to the memory device based on comparing the first response key to a first predetermined value and receiving the acknowledgement signal from the memory device. The method also includes where the security module generates the first challenge request as part of a power-up sequence for the storage device. The method also includes where the memory device generates and sends the second challenge request prior to the security module generating and sending the first challenge request in response to the power-up sequence for the storage device. The method also includes where the security module generates and sends the second challenge request upon receiving the first challenge request and before sending the first response key. The method further comprises generating, by the storage controller, a start signal, and sending the start signal to the memory device to generate and send a second challenge request to the security module via the storage controller.

This disclosure also includes a method of operating a storage device, comprising generating, by a security module coupled to a storage controller, a first challenge request and sending the first challenge request to a memory device via the storage controller, sending, by the memory device, a first response key in response to the first challenge request to the security device via the storage controller, comparing, by the storage controller, the first response key to a predetermined value stored by the security module, and disabling, by the storage controller, an enable signal to the memory device based on an unsuccessful comparison. The method also includes generating, by a security module coupled to a storage controller, a first challenge request and sending the first challenge request to the memory device via the storage controller, sending, by the memory device, a first response key in response to the first challenge request to the security device via the storage controller, generating, by the memory device, a second challenge request and sending the second challenge request to the security module via the storage controller, sending, by the security module, a second response key in response to the second challenge request to the memory device via the storage controller, disabling, by the memory device, an acknowledgement signal based on an unsuccessful comparison of the second response key and a second predetermined value, and disabling, by the storage controller, an enable signal to the memory device based on the unsuccessful comparison. The method also includes sending a status signal to a host device indicating that the first challenge request was unsuccessful. The method also includes sending a status signal to a host device indicating that the second challenge request was unsuccessful.

The disclosure also includes a storage device, comprising one or more memory devices, where the one or more memory devices includes a second challenge question and a first response key, an interface, a storage controller coupled to the interface and coupled to the one or more memory devices, where the storage controller generates an enable signal sent to the one or more memory devices for enabling access to the one or more memory devices a security module coupled to the storage controller and configured to send and receive challenge requests and challenge responses, where the security module includes a first challenge question and a second response key, and means for enabling and disabling access to the one or more memory devices by employing multiple challenges and responses for mutual authentication of the one or more memory devices. The storage device also includes the one or more memory devices configured to send an acknowledgement signal to the storage controller indicating that the second response key has been accepted. The storage device also includes the storage controller configured to disable the enable signal sent to the one or more memory devices in response to a comparison of the first response key and a first predetermined value stored in the security module. The storage device also includes means for disabling access to the one or more memory devices based on a comparison of the second response key and a second predetermined value stored in the security module. The storage device also includes the storage controller configured to send a status signal to a host device via the interface indicating that one or more challenge requests were unsuccessful.

The disclosure also includes a storage system, having a host device, one or more memory devices, where each of the one or more memory devices is configured to store a second challenge question and a first response key, an interface configured to couple to the host device, a storage controller coupled to the interface and coupled to the one or more memory devices, where the storage controller generates an enable signal for enabling access to the one or more memory devices, and a security module coupled to the storage controller and configured to send and receive challenge requests and challenge responses, where the security module includes a first challenge question and a second response key corresponding to each of the one or more memory devices. The system also includes the storage controller configured to send a status signal to the host device via the interface indicating that one or more challenge requests were unsuccessful. The system also includes the one or more memory devices configured to send an acknowledgement signal to the storage controller indicating that the second response key has been accepted by the one or more memory devices. The system also includes the storage controller configured to send a start signal to the one or more memory devices to send a second challenge request to the security module via the storage controller.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
one or more non-volatile memory devices, wherein each of the one or more non-volatile memory devices is configured to store a second challenge question and a first response key;
an interface;
a storage controller coupled to the interface and coupled to the one or more non-volatile memory devices, wherein the storage controller is configured to:
generate an enable signal to enable access to the one or more non-volatile memory devices;
withdraw the enable signal to disable access to the one or more non-volatile memory devices; and
employ a first challenge question, the second challenge question, a first challenge response, and a second challenge response of mutual authentication of the one or more non-volatile memory devices; and
a security module coupled to the storage controller, wherein the security module includes:
one or more memory locations comprising the first challenge question and a second response key corresponding to each of the one or more non-volatile memory devices; and
a random number generator configured to create a cryptographic nonce alphanumeric value used to generate the second challenge response,
the security module configured to:
send, to the one or more non-volatile memory devices, the first challenge question;
receive, from the one or more non-volatile memory devices, the first challenge response based upon the first response key;
receive, from the one or more non-volatile memory devices, the second challenge question; and
send, to the one or more non-volatile memory devices, the second challenge response based upon the second response key.

2. The storage device of claim 1, wherein the security module is a hardware device electrically coupled to the storage controller.

3. The storage device of claim 1, wherein the security module comprises firmware.

4. The storage device of claim 1, wherein the cryptographic nonce comprises a unique and random alphanumeric value.

5. The storage device of claim 1, wherein the second challenge response is further generated by a cryptographically-secure hash function.

6. The storage device of claim 1, wherein the storage controller is further configured to manage access to the one or more non-volatile memory devices by sending the enable signal to the one or more non-volatile memory devices.

7. The storage device of claim 1, wherein:
each of the one or more non-volatile memory devices comprises the first response key at manufacturing of the storage device; and
the security module comprises the second response key at manufacturing of the storage device.

8. A method of operating a storage device, comprising:
generating, by a security module coupled to a storage controller, a first challenge request and sending the first challenge request to a non-volatile memory device via the storage controller, wherein the non-volatile memory device comprises a first response key, and wherein the security module comprises a second response key;
sending, by the non-volatile memory device, a first challenge response based upon the first response key in response to the first challenge request to the security module via the storage controller;
generating, by the non-volatile memory device, a second challenge request and sending the second challenge request to the security module via the storage controller;
sending, by the security module, a second challenge response based upon the second response key in response to the second challenge request to the non-volatile memory device via the storage controller, wherein the second challenge response is generated by using a random number generator to create a cryptographic nonce alphanumeric value;
generating, by the non-volatile memory device, an acknowledgement signal based on comparing the second challenge response and a second predetermined value; and
generating, by the storage controller, an enable signal and sending the enable signal to the non-volatile memory device based on comparing the first challenge response to a first predetermined value and receiving the acknowledgement signal from the non-volatile memory device, wherein the storage controller disables an enable signal to the non-volatile memory device based on an unsuccessful comparison.

9. The method of claim 8, wherein the security module generates the first challenge request as part of a power-up sequence for the storage device.

10. The method of claim 8, wherein the non-volatile memory device generates and sends the second challenge request prior to the security module generating and sending the first challenge request in response to a power-up sequence for the storage device.

11. The method of claim 8, wherein the security module generates and sends the second challenge request upon receiving the first challenge request and before sending the first challenge response.

12. The method of claim 8, further comprising:
generating, by the storage controller, a start signal; and
sending the start signal to the non-volatile memory device to generate and send a second challenge request to the security module via the storage controller.

13. A method of operating a storage device, comprising:
generating, by a security module coupled to a storage controller, a first challenge request and sending the first challenge request to a non-volatile memory device via the storage controller, wherein the non-volatile memory device comprises a first response key, and wherein the security module comprises a second response key;
sending, by the non-volatile memory device, a first challenge response based upon the first response key in response to the first challenge request to the security module via the storage controller;
comparing, by the storage controller, the first challenge response to a first predetermined value stored by the security module;

disabling, by the storage controller, an enable signal to the non-volatile memory device based on an unsuccessful comparison of the first challenge response and the first predetermined value;

generating, by the non-volatile memory device, a second challenge request and sending the second challenge request to the security module via the storage controller;

sending, by the security module, a second challenge response based upon the second response key in response to the second challenge request to the non-volatile memory device via the storage controller;

comparing, by the non-volatile memory device, the second challenge response to the second predetermined value stored by the security module; and disabling, by the storage controller, the enable signal to the non-volatile memory device based on the unsuccessful comparison of the second challenge response and the second predetermined value.

14. The method of claim 13, further comprising sending a status signal to a host device indicating that the first challenge request was unsuccessful.

15. The method of claim 13, further comprising sending a status signal to a host device indicating that the second challenge request was unsuccessful.

16. A storage device, comprising:
one or more non-volatile memory devices, wherein the one or more non-volatile memory devices is configured to store a second challenge question and a first response key, the one or more non-volatile memory devices configured to generate a first challenge response based upon the first response key;
an interface;
a storage controller coupled to the interface and coupled to the one or more non-volatile memory devices, wherein the storage controller is configured to:
generate an enable signal sent to the one or more non-volatile memory devices enabling access to the one or more non-volatile memory devices; and
enable and disable access to the one or more non-volatile memory devices by employing multiple challenges and responses of mutual authentication of the one or more non-volatile memory devices; and
a security means for sending and receiving challenge requests and challenge responses, the security means coupled to the storage controller, wherein the security means includes:
one or more memory locations comprising a first challenge question and a second response key; and
a random number generator configured to create a cryptographic nonce alphanumeric value used to generate a second challenge response based upon the second response key.

17. The storage device of claim 16, wherein the one or more non-volatile memory devices is configured to send an acknowledgement signal to the storage controller indicating that the second challenge response has been accepted.

18. The storage device of claim 16, wherein the storage controller is further configured to disable the enable signal sent to the one or more non-volatile memory devices in response to a comparison of the first challenge response and a first predetermined value stored in the security means.

19. The storage device of claim 16, further comprising means for disabling access to the one or more non-volatile memory devices based on a comparison of the second challenge response and a second predetermined value stored in the security means.

20. The storage device of claim 16, wherein the storage controller is further configured to send a status signal to a host device via the interface indicating that one or more challenge requests were unsuccessful.

21. The storage device of claim 16, wherein:
each of the one or more non-volatile memory devices comprises the first response key at manufacturing of the storage device; and
the security means comprises the second response key at manufacturing of the storage device.

22. A storage system, comprising:
a host device;
one or more non-volatile memory devices, wherein each of the one or more non-volatile memory devices is configured to store a second challenge question and a first response key;
an interface configured to couple to the host device;
a storage controller coupled to the interface and coupled to the one or more non-volatile memory devices, wherein the storage controller is configured to:
generate an enable signal to enable access to the one or more non-volatile memory devices;
withdraw the enable signal to disable access to the one or more non-volatile memory devices; and
employ a first challenge question, the second challenge question, a first challenge response, and a second challenge response of mutual authentication of the one or more non-volatile memory devices; and
a security module coupled to the storage controller, wherein the security module includes:
one or more memory locations comprising a first challenge question and a second response key corresponding to each of the one or more non-volatile memory devices; and
a random number generator configured to create a cryptographic nonce alphanumeric value used to generate a second challenge response,
wherein the security module is configured to:
send, to the one or more non-volatile memory devices, the first challenge question;
receive, from the one or more non-volatile memory devices, the first challenge response based upon the first response key;
receive, from the one or more non-volatile memory devices, the second challenge question; and
send, to the one or more non-volatile memory devices, the second challenge response based upon the second response key.

23. The system of claim 22, wherein the storage controller is further configured to send a status signal to the host device via the interface indicating that one or more challenge requests were unsuccessful.

24. The system of claim 22, wherein the one or more non-volatile memory devices are further configured to send an acknowledgement signal to the storage controller indicating that the second challenge response has been accepted by the one or more non-volatile memory devices.

25. The system of claim 22, wherein the storage controller is further configured to send a start signal to the one or more non-volatile memory devices to send a second challenge request to the security module via the storage controller.

* * * * *